United States Patent
Berle et al.

(10) Patent No.: US 10,421,525 B2
(45) Date of Patent: Sep. 24, 2019

(54) BEARING SUPPORT SYSTEM AND METHOD FOR A TURRET ON A VESSEL

(71) Applicant: ONESUBSEA IP UK LIMITED, London, England (GB)

(72) Inventors: Atle K. Berle, Ulset (NO); Lars Seim, Haukeland (NO)

(73) Assignee: OneSubsea IP UK Limited (GB)

(*) Notice: Subject to any disclaimer, the term of this patent is extended or adjusted under 35 U.S.C. 154(b) by 73 days.

(21) Appl. No.: 14/932,226

(22) Filed: Nov. 4, 2015

(65) Prior Publication Data

US 2017/0120994 A1    May 4, 2017

(51) Int. Cl.
| | |
|---|---|
| B63B 35/44 | (2006.01) |
| B63B 43/00 | (2006.01) |
| F16C 19/36 | (2006.01) |
| B63B 21/50 | (2006.01) |
| B63B 22/02 | (2006.01) |
| F16C 41/02 | (2006.01) |
| F16C 27/08 | (2006.01) |
| F16C 19/50 | (2006.01) |

(52) U.S. Cl.
CPC ............ B63B 43/00 (2013.01); B63B 21/507 (2013.01); B63B 22/026 (2013.01); F16C 19/36 (2013.01); F16C 27/08 (2013.01); F16C 41/02 (2013.01); *F16C 19/507* (2013.01); *F16C 2326/30* (2013.01)

(58) Field of Classification Search
CPC . B63B 21/507; B63B 22/026; B63B 35/4413; B63B 2035/448
See application file for complete search history.

(56) References Cited

U.S. PATENT DOCUMENTS

| | | | |
|---|---|---|---|
| 4,753,553 A * | 6/1988 | Carlsen | B63B 21/507 114/230.12 |
| 5,515,804 A | 5/1996 | Pollack | |
| 5,762,017 A * | 6/1998 | Groves | B63B 21/507 114/230.12 |
| 6,263,822 B1 * | 7/2001 | Fontenot | B63B 21/507 114/230.12 |

(Continued)

FOREIGN PATENT DOCUMENTS

| | | |
|---|---|---|
| EP | 0207915 A1 | 1/1987 |
| WO | 93/07049 A1 | 4/1993 |
| WO | 2014/172570 A2 | 10/2014 |

OTHER PUBLICATIONS

International Patent Application No. PCT/EP2016/075754 International Search Report and Written Opinion dated Jan. 2, 2017 (14 pages).

(Continued)

*Primary Examiner* — Andrew Polay

(57) ABSTRACT

A bearing system for a rotating turret mounted on a vessel includes upper radial and axial bearings placed on a stiff bearing support ring. The bearing support ring is isolated from deflections in the vessel's caisson. Through the isolation, the radial and axial bearings are less affected by deflection of the vessel for example due to waves. The bearing support ring is supported vertically by a system of hydraulic cylinders serviced by multiple hydraulic systems for redundancy. The bearing support ring alternatively can be supported by an articulated steel structure.

15 Claims, 7 Drawing Sheets

(56) References Cited

U.S. PATENT DOCUMENTS

| | | |
|---|---|---|
| 6,827,493 B2 | 12/2004 | Hooper |
| 7,063,032 B2 | 6/2006 | Lindblade et al. |
| 2003/0121465 A1 | 7/2003 | Boatman et al. |
| 2014/0050428 A1 | 2/2014 | Lindblade et al. |

OTHER PUBLICATIONS

International Preliminary Report on Patentability dated May 17, 2018, for International Application No. PCT/EP2016/075754 (10 pgs).

* cited by examiner

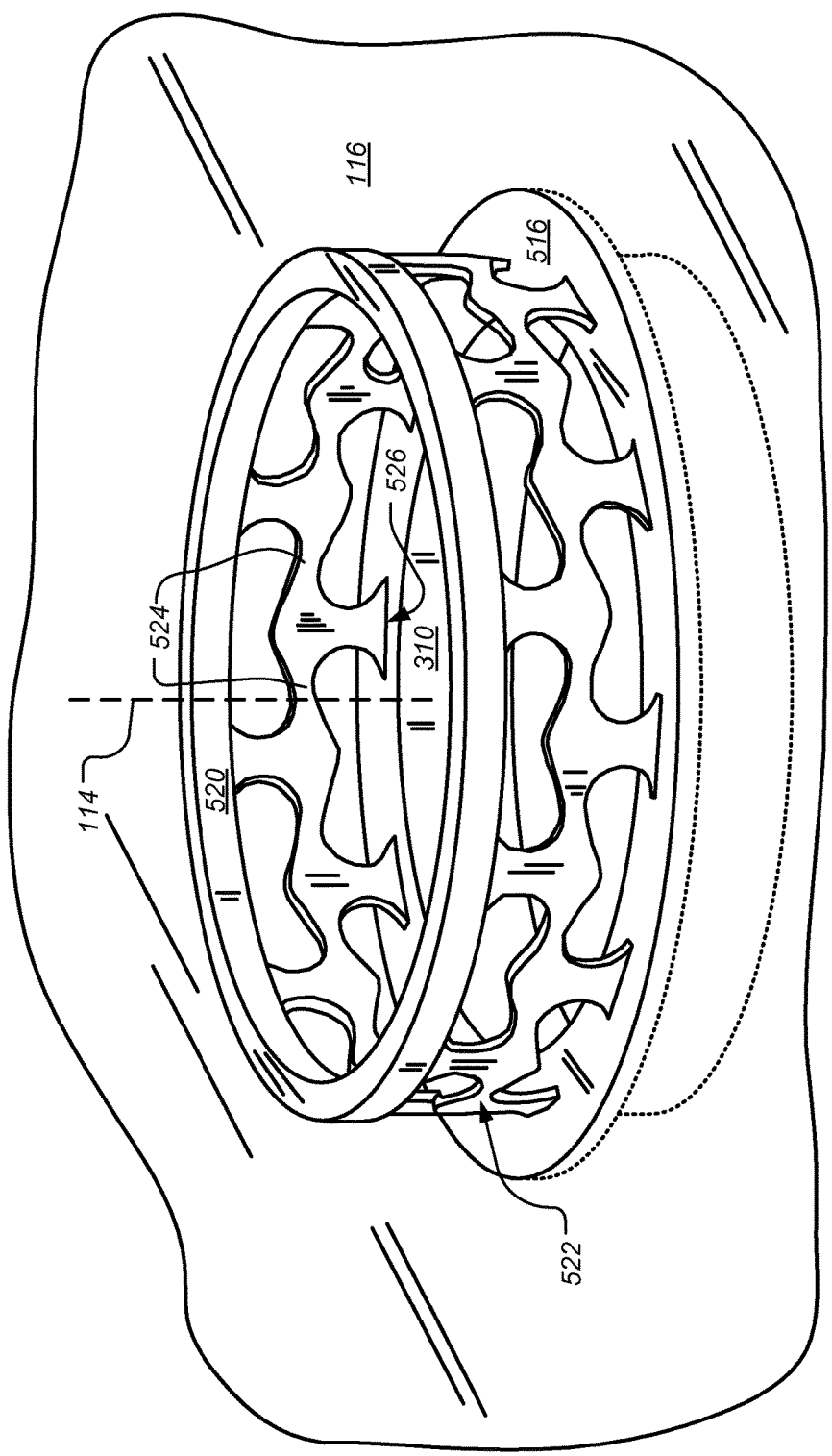

BEARING SUPPORT SYSTEM AND METHOD FOR A TURRET ON A VESSEL

TECHNICAL FIELD

The present disclosure relates generally to vessels such as those used for offshore drilling or production. More particularly, the present disclosure relates to a bearing support system and method for turrets on such vessels.

BACKGROUND

Radial and axial bearings are used to support a turret on a vessel, for example a floating production, storage and offloading (FPSO) vessel or a floating storage and offloading (FSO) vessel. The FPSO/FSO vessel can be moored using a turret mooring system in which a fixed turret column is held by an internal or external vessel structure using a bearing arrangement. The vessel-bound components can weathervane freely around the turret, which is fixed via a number of anchor lines with respect to the seabed. This arrangement allows the vessel to adopt the direction of least resistance against wind, current, and wave influences.

When harsh wind and/or waves impact a FPSO/FSO vessel, the turret is pressed against the radial and axial turret bearings. Furthermore, the vessel's hull bends in various ways, such as hogging and sagging. To deal with this bending, some kind of flexibility can be introduced into the bearing system to ensure that the load is distributed among many wheels rather than overloaded onto one or two wheels. A known design is to mount and spring-load wheels, as described in U.S. Pat. No. 5,860,382. The described structure has a spring-loaded wheel in a box assembly, with a spring rod fixed horizontally and vertically to the box assembly. Outer guiding of the box assembly is done by brackets or slots in the surrounding ship structure, or with large steel sections around the rotatable turret rail. The spring rod is fastened to a lid that has to be bolted to the surrounding structure. This type of arrangement uses a fine alignment between the box assembly and the spring rod, and also has fine tolerances in the surrounding structure. The radial loads go through the lid bolts, even when the springs are totally compressed and extreme stemming loads occur.

Improvements in spring-loaded wheel bearings are described in International Patent App. Pub. No. WO 2014/172570, incorporated by reference herein, which discusses cartridge-installable radial bearing sub-assemblies having spring systems configured to pass large radial forces into a vessel's supporting structure. Additionally or alternatively, U.S. Pat. No. 7,063,032 discusses a bearing assembly having sufficiently long vertical support beams so that a lower portion of the bearing support assembly can be connected to the vessel near the vertical center of the vessel in order to minimize deflections of the bearing assembly due to hogging or sagging of the vessel.

SUMMARY

This summary is provided to introduce a selection of concepts that are further described below in the detailed description. This summary is not intended to identify key or essential features of the claimed subject matter, nor is it intended to alter or limit the scope of the claimed subject matter.

According to some embodiments, a bearing support system is described that is configured to support rotation of a turret carried by a vessel. The bearing support system may include a deflectable vessel support structure with an opening through which the turret is positioned; a stiff bearing support member to resist deflection in response to an external force on the vessel; a bearing surface positioned in a fixed relationship with the bearing support member; and a deflection isolation system to isolate the bearing support member from a deflection in the vessel support structure while allowing the vessel support structure to support and maintain rotational alignment about the turret axis with the bearing support member.

According to some embodiments, the deflection isolation system may include hydraulic cylinders between the vessel support structure and the bearing support member. The hydraulic cylinders may collectively absorb and dampen deflections passing from the vessel support structure to the bearing support member. Posts can be positioned parallel to the turret axis to allow relative movement between the vessel support structure and bearing support member axially but not rotationally. According to some embodiments, the hydraulic cylinders may be divided into groups supplied with hydraulic fluid using separate hydraulic systems, thereby providing fault tolerance in case of a fault in a single hydraulic system.

According to some embodiments, the deflection isolation system may include an articulated steel structure that articulates through deflection of a plurality of integrated steel portions thereby isolating the bearing support member from the deflections. The articulated steel structure can be made of a single piece of steel. The articulated steel structure can be configured to spread out a localized deflection from the vessel support structure such that it is passed to the bearing support member over a larger area. According to some embodiments, the deflection isolation system is fixedly mounted to the vessel support structure at a location away from a vertical center of the vessel, such as at or near an upper external deck of the vessel.

According to some embodiments, a method of supporting rotation of a turret mounted on a vessel is described that includes reducing the transmission of deflections in a vessel support structure to a bearing support member using a deflection isolation system fixedly mounted to the vessel support structure at a location away from a vertical center of the vessel, while supporting the bearing support member and maintaining rotational alignment about the turret axis between the vessel support structure and the bearing support member.

BRIEF DESCRIPTION OF THE DRAWINGS

The subject disclosure is further described in the detailed description which follows, in reference to the following drawings of non-limiting embodiments of the subject disclosure. The features depicted in the figures are not necessarily shown to scale. Certain features of the embodiments may be shown exaggerated in scale or in somewhat schematic form, and some details of elements may not be shown in the interest of clarity and conciseness. Like reference numerals and designations in the various drawings indicate like elements.

FIG. 5 is a perspective view of a bearing support system for a turret mounted in a vessel, according to some embodiments of the present disclosure.

DETAILED DESCRIPTION

One or more specific embodiments of the present disclosure will be described below. The particulars shown herein are by way of example and for purposes of illustrative discussion of the embodiments of the subject disclosure only, and are presented in the cause of providing what is believed to be the most useful and readily understood description of the principles and conceptual aspects of the subject disclosure. In this regard, no attempt is made to show structural details of the subject disclosure in more detail than is necessary for the fundamental understanding of the subject disclosure, the description taken with the drawings making apparent to those skilled in the art how the several forms of the subject disclosure may be embodied in practice. Additionally, in an effort to provide a concise description of these exemplary embodiments, all features of an actual implementation may not be described in the specification. It should be appreciated that in the development of any such implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are used in an open-ended fashion, and thus should be interpreted to mean "including, but not limited to . . . " Also, any use of any form of the terms "connect," "engage," "couple," "attach," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" or "rotational" and "rotationally" generally mean perpendicular to the central axis. The use of "top," bottom," "above," "below," "upper," "lower," and variations of these terms is made for convenience, but does not require any particular orientation of the components.

Certain terms are used throughout the description and claims to refer to particular features or components. As one skilled in the art will appreciate, different persons may refer to the same feature or component by different names. This document does not intend to distinguish between components or features that differ in name but not function.

Figure 1:
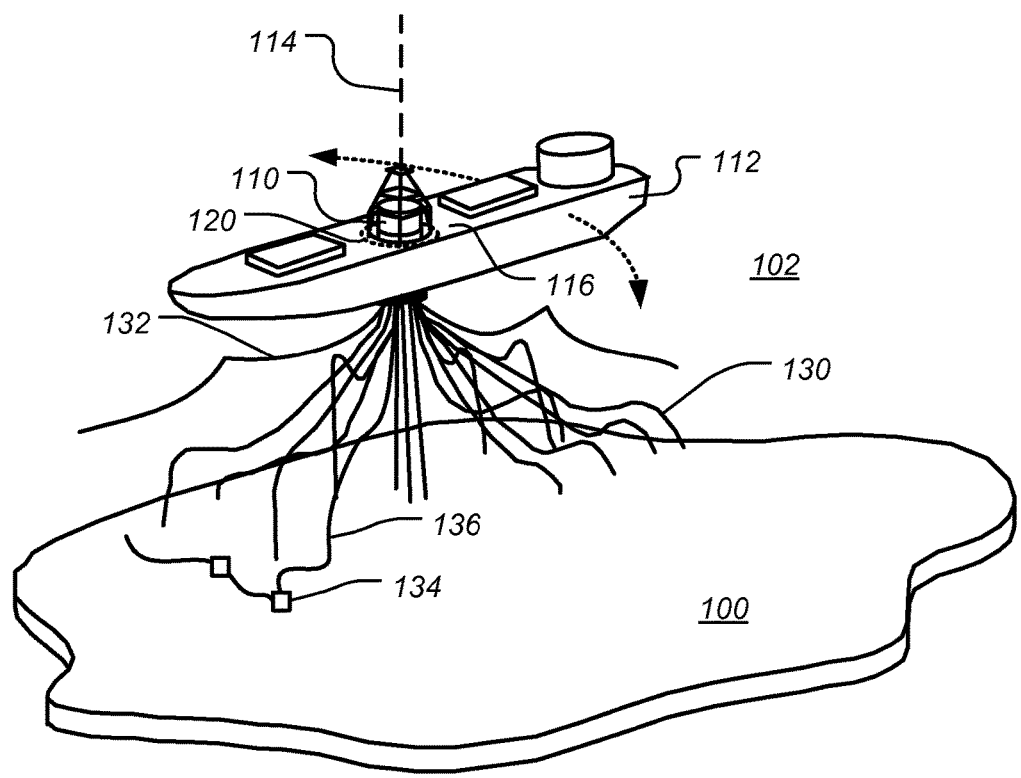
FIG. 1 is a diagram illustrating a vessel supporting a turret using a bearing system, according to some embodiments of the present disclosure.

FIG. 1 is a diagram illustrating a vessel supporting a turret using a bearing system, according to some embodiments of the present disclosure. Vessel 112 is shown on the surface of seawater 102. According to some examples, vessel 112 is a floating production, storage and offloading (FPSO) vessel configured to receive hydrocarbons produced from subsea subterranean reservoirs, to process and/or store the received hydrocarbons. Vessel 112 includes an internal, hull-mounted, rotatable turret 110 and a vessel structure 116 that surrounds the turret 110. Although an FPSO vessel 112 is shown, the embodiments described herein are equally applicable to an FSO vessel or other vessel used for similar purpose. Also, although vessel 112 is shown in FIG. 1 with an internally mounted turret, the embodiments described herein are equally applicable to other types of turret mountings including external turret mountings.

The turret bearing system 120 can include axial bearings and radial bearings. Vessel 112 can be exposed to substantial wind, current and wave influences. When harsh wind and/or wave impact occurs on vessel 112, the turret 110 can be pushed in axial and radial directions (with reference to vertical turret axis 114). Bearing system 120 allows the vessel 112 to weathervane 360° in either direction around the vertical turret axis 114, as shown by the dotted arrows. Risers 130 and anchor chains 132 are locked to the lower part of the turret 110. Thus in operation the turret 110 is in "fixed" rotational alignment with the mooring system and therefore also with the sea bed, while the hull of the vessel 112 and surrounding vessel structure 116 are able to rotate about turret axis 114. According to some embodiments, the turret 110 also may be used to supply an umbilical 136 that may include for example electric and/or hydraulic lines (not shown) to a subsea system 134 which can be, for example, a subsea pump and/or compressor.

Figure 2A:
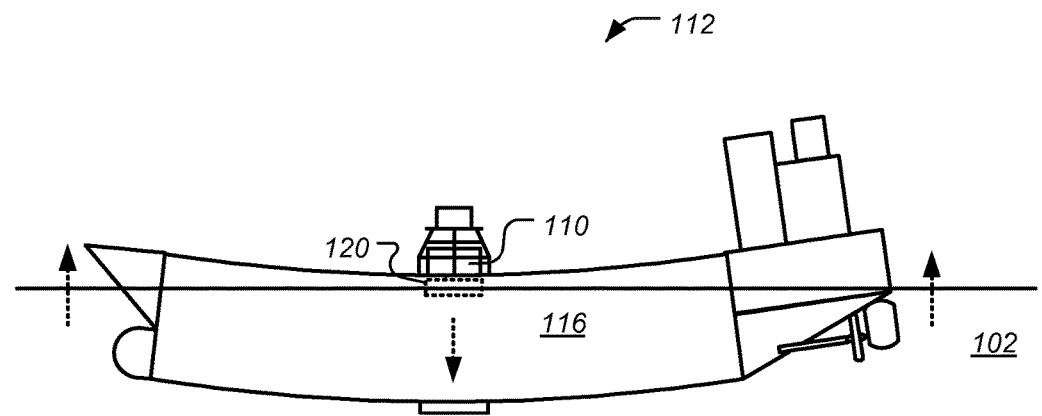
FIGS. 2A and 2B are diagrams illustrating vessel deflections that are accommodated by the turret bearing support system, according to some embodiments of the present disclosure.
Figure 2B:
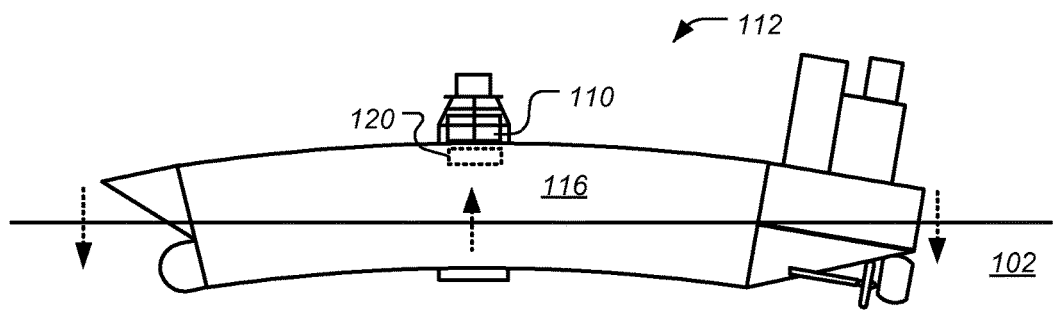

FIGS. 2A and 2B are diagrams illustrating vessel deflections that may be accommodated by the turret bearing support system of the present disclosure, according to some embodiments. FIG. 2A shows vessel 112 on seawater 102 being exposed to a sagging deflection. FIG. 2B shows vessel 112 being exposed to a hogging deflection. The ship or vessel structure 116, also referred to herein as the caisson, is deflected in the sagging and hogging directions as shown. The bearing system 120 needs to deal with these types of deflections. Typical bending or deflection of the structure or caisson 116 is about 1 mm per meter of turret diameter. Thus for a ten meter diameter turret 110, a typical deflection in the turret opening of caisson 116 is about 10 mm. A known solution for dealing with this deformation is to precisely locate each bearing element and provide pre-tensioned springs in the bearing wheel assemblies to ensure even distribution of loads under the deflecting conditions. According to some embodiments of the present disclosure, however, and as described further below, the bearing system 120 may include a stiff bearing support ring that is isolated from the caisson deflections. Through the isolation techniques described herein, the bearing system 120 is able to deal with deflections due to hogging and sagging (see FIGS. 2B and 2A, respectively), despite being mounted away from the vertical center of the vessel. Further, as shown in FIGS. 2A and 2B, the isolation techniques of the present disclosure allow for the bearing system 120 to be connected to vessel 112 at an elevation much higher than the vessel's vertical center, such as at or near the upper deck of the vessel 112.

Figure 3:
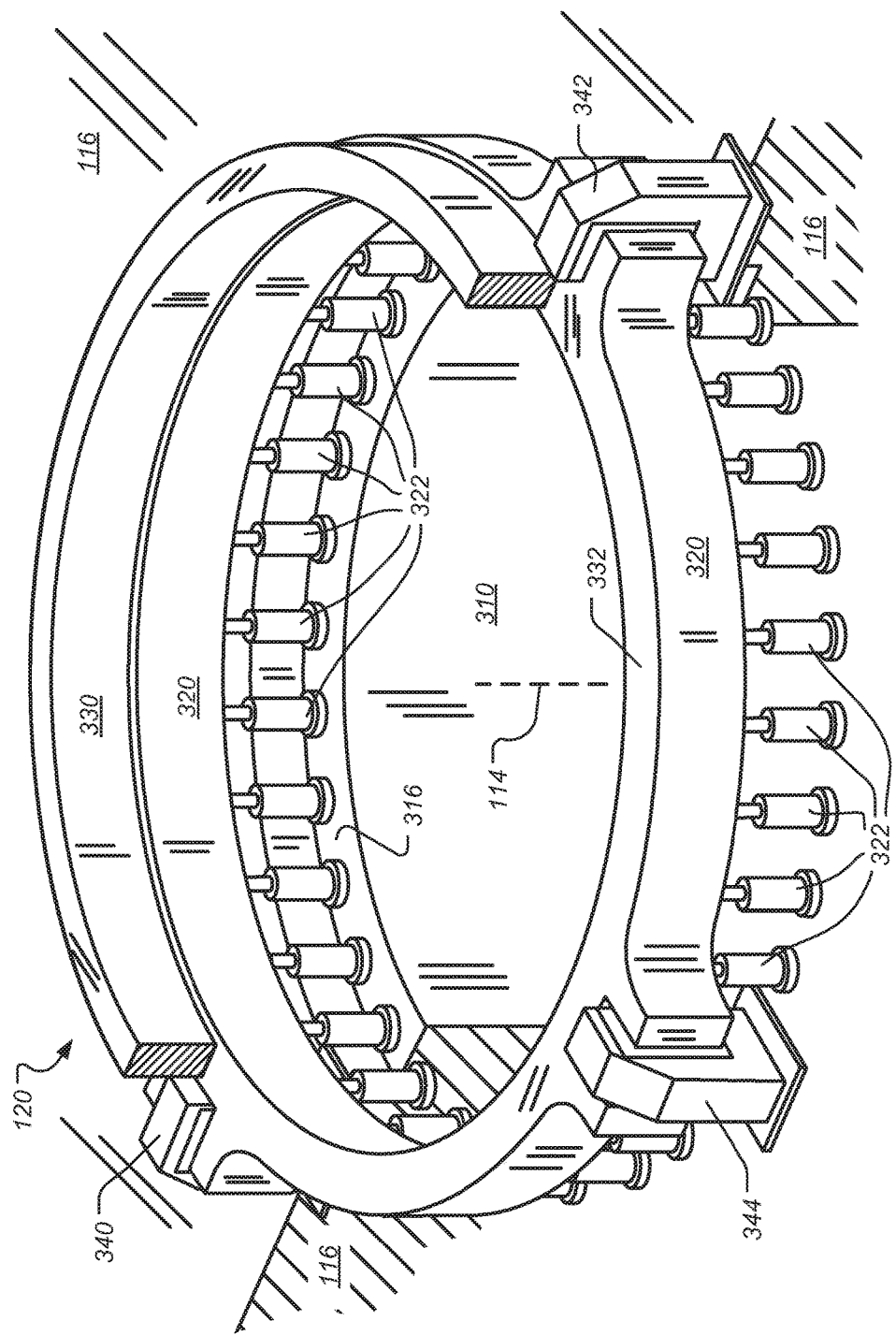
FIG. 3 is a partial cut-away perspective view of a bearing support system for a turret mounted in a vessel, according to some embodiments of the present disclosure.

FIG. 3 is a partial cut-away perspective view of a bearing support system for a turret mounted in a vessel, according to some embodiments of the present disclosure. A portion of the ship's support structure or caisson 116 is shown with a central opening 310 through which the turret is positioned. Note that the turret is not shown for clarity. The upper turret bearing 330 is mounted on a bearing support ring 320, which is subjected to only minor deflections due to sagging, hogging and twisting of the ship's hull and caisson 116.

The stiff bearing support ring 320 may be supported vertically by use of multiple systems of hydraulic cylinders 322. According to some embodiments, the hydraulic cylinders 322 are supplied using multiple hydraulic systems for redundancy. The stiff bearing support ring 320 is held in place by one or more support posts, for example four posts, of which three posts 340, 342, and 344 are visible in FIG. 3. The posts 340, 342, 344 are constructed to be very stiff and are welded or otherwise securely mounted to the main deck or the caisson 116. The posts 340, 342, 344 allow the stiff bearing support ring 320 to slide in a direction substantially parallel to the turret axis 114. The posts 340, 342, 344 are also configured to prevent the stiff bearing support ring 320 to rotate with respect to caisson 116.

According to some embodiments, the four posts 340, 342, 344 are orientated such that two posts 340, 342 are placed on the centerline of vessel 112, and two posts, 344 and another (not shown) are placed transverse of the centerline. By positioning the posts in this fashion, sliding movement of the stiff bearing support ring 320 in the axial direction, i.e. substantially parallel to turret axis 114, is not blocked or obstructed.

On an upper surface 332 of the bearing support ring 320, the upper turret bearing 330 is mounted. The bearing support ring 320 is machined on its upper surface 332 to provide a bearing surface for axial and/or radial bearings. The inner or outer surfaces of bearing support ring 320 are also machined to provide a bearing surface for radial bearings. The upper turret bearing 330 and the bearing support ring 320 can be held together, for example using bolts, screws, rivets, or other means of mechanical fastening.

One or more upper radial and axial bearings (not shown) are placed on the upper turret bearing 330, which is a stiff ring structure that is isolated from deflections in caisson 116. Therefore, the radial and axial bearings are not affected by deflection of the vessel.

As shown in FIGS. 3 and 4, on the lower side of the stiff bearing support ring 320 there are lugs or other device(s) for attaching the hydraulic cylinder piston rods of hydraulic cylinders 322. Further lugs or devices for attaching the hydraulic cylinders 322 to the main deck of caisson structure 116 may be welded directly or indirectly on a pitch circle diameter (PCD) 316, for example, in a similar fashion to the lugs on the lower side of the stiff support ring 320.

The bearing support ring 320 is a foundation for the bearings and acts as a "floating support" that is supported on the vessel structure 116. Note that each of the lugs welded to the vessel structure/caisson 116 can grossly deviate from in-plane mounting. Likewise the ship structure 116 can bend and/or twist (deflect) without interfering with the bearing system's ability to function properly. Each hydraulic cylinder 322 has the same load on the positive (+) chambers, and each cylinder 322 has the same load on the negative (−) chambers.

According to some embodiments, the bearing support ring 320 is made of normal structural steel, and fabricated according to normal welding tolerances. The machining of the bearing support ring 320 can be performed using outdoor transportable milling and drilling machines, for example. The bearing support ring 320 can also be machined at quayside. The lugs between the hydraulic cylinders 322 and the caisson 116 can be welded with relatively large tolerances. The upper turret bearing 330 can be mounted, e.g. using bolts, on the bearing support ring 320 on-site at the yard as well.

The relatively stiff bearing support ring 320 keeps the deflections of the bearing system to a minimum. Therefore the use of all types of bearing systems are possible, even roller bearing types, which rely on stringent tolerances. Since loads are more uniformly transferred to the bearings, the bearing capacity contingency can be substantially reduced.

Figure 4A:
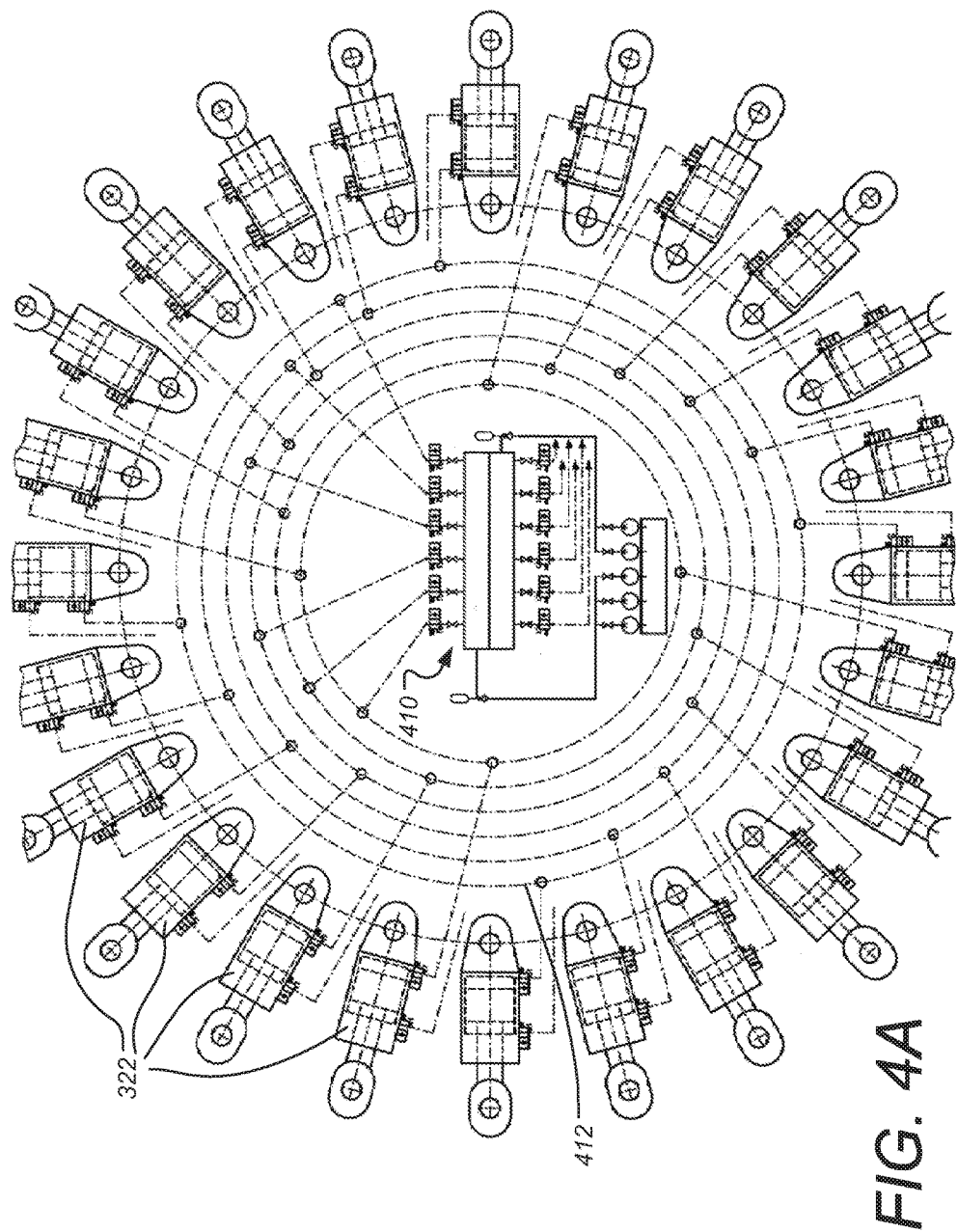
FIGS. 4A and 4B are schematic diagrams showing some aspects of the hydraulic systems, according to some embodiments of the present disclosure.
Figure 4B:
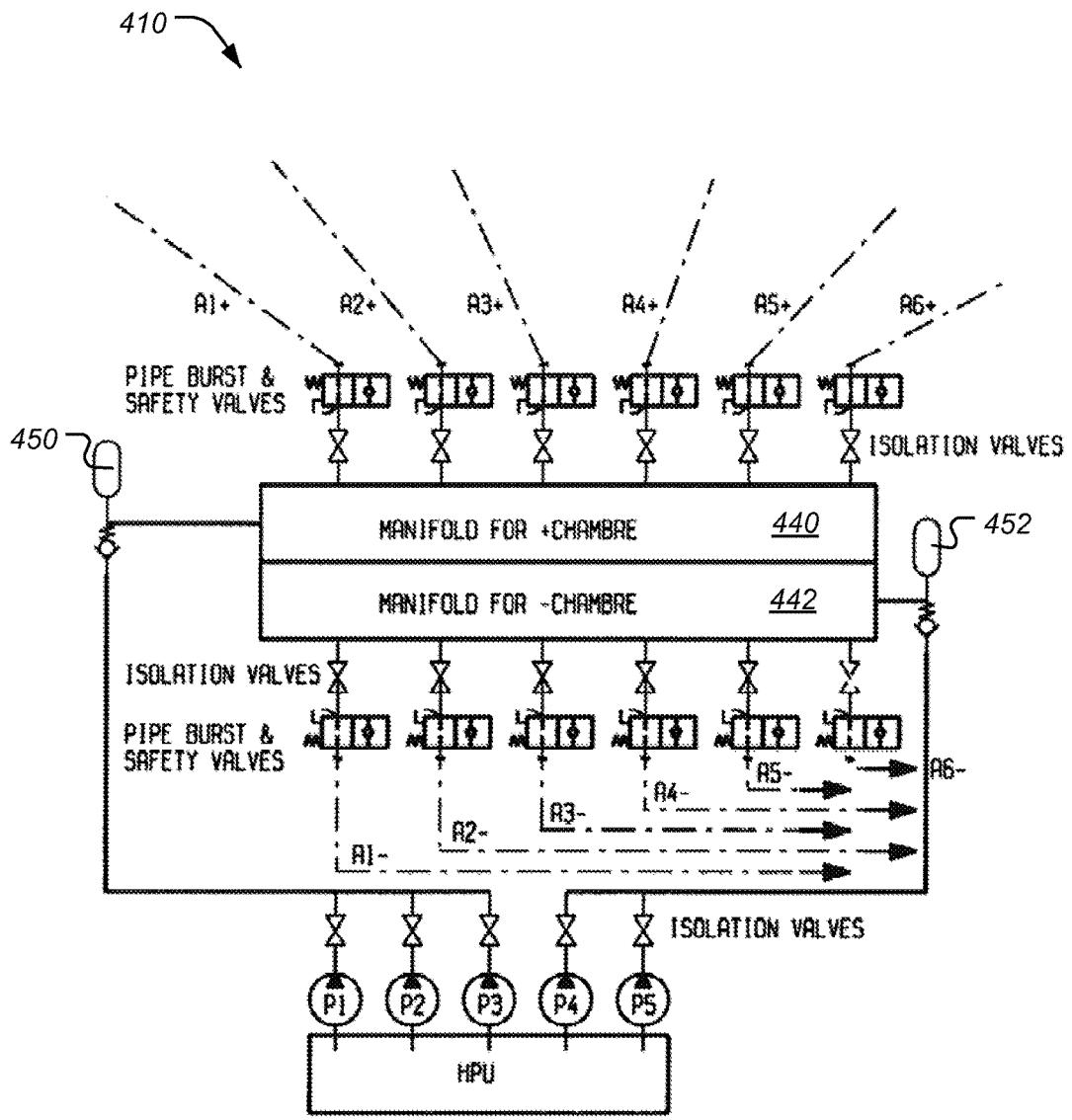

FIGS. 4A and 4B are schematic diagrams showing some aspects of the hydraulic systems used for isolating the bearing support ring 320 from the vessel's deflections, according to some embodiments. The hydraulic cylinders 322 each have a positive (+) port and a negative (−) port. The hydraulic cylinders 322 are divided into a number of groups, e.g. six groups or more, with each group using its own separate hydraulic system. Each system of hydraulic cylinders is interconnected with hydraulic lines to the respective chamber supply systems, therefore the respective chambers for cylinders in the same group are also interconnected to each other.

The number of systems of hydraulic cylinders is guided by functional and safety requirements. For example, with six systems, if one system fails, there is still a residual capacity of 83.3% (⅚) of the initial capacity. In the case shown, there are 24 hydraulic cylinders in total, so each of the six hydraulic systems includes four hydraulic cylinders, which are interconnected by hydraulic lines on the +ports (e.g. line 412) and the −ports. As can be seen in FIG. 4B, each of the +port systems and each of the −port systems are equipped with a pipeline burst/safety valve. Each of these two lines is connected to a small hydraulic accumulator (450 and 452). These two lines are connected to common manifolds (440 and 442) for all systems, and each of the lines is equipped with a pipeline burst valve and an isolation valve.

In case one of the lines is broken, the pipeline burst valve will be closed. To avoid hydraulic cylinders that have a closed burst valve being subjected to excess forces, the safety valve will open at pre-set pressure that is set higher than the normal maximum working pressure. According to some embodiments, the pre-set pressure is approximately 15-20% higher than the maximum working pressure. The isolation valve can be used at time of installation or replacement of the hydraulic cylinders, for instance. Although six groups are shown in the example of FIGS. 4A and 4B, other numbers of groups, for example eight, nine, or ten groups, are possible.

FIG. 5 is a perspective view of a bearing support system for a turret mounted in a vessel, according to some embodiments. The upper turret bearing is mounted on a stiff bearing support ring 520, which is subjected to only minor deflections due to sagging, hogging and twisting of the ship's hull or vessel support/caisson 116. The stiff bearing support ring 520 is supported vertically and horizontally by an articulated support structure 522. The articulated support structure 522 distributes and transfers the loads between the stiff bearing support ring 520 and the vessel structure/caisson 116. In FIG. 5 the structure base 516 is fixedly mounted in caisson 116. The vessel structure/caisson 116 and base 516 are subject to hogging, sagging and twisting movements. If the base 516 at one of the articulated steel structure 522 attachment points (e.g. at point 526) is subject to elastic deflection, the articulated support structure 522 will deflect at this location (e.g. at locations 524). According to some embodiments, the stiffness of the articulated support structure 522 is calculated and designed to withstand the maximum expected loads, while still having a suitable fatigue lifetime.

The upper radial and axial bearings are placed on the stiff bearing support ring 520 and therefore are not affected by the vessel's deflection. The bearing support ring 520 therefore acts as floating support on the caisson. The vessel structure/caisson can bend and twist (deflect) without interfering with the bearing system's ability to function properly.

The articulated support structure 522 is a stand-alone part that can be integrated, for example by welding, into a vessel. The bearing support ring 520 can be machined on its upper surface and supplied with boltholes for bolting the bearings to the support ring. According to some embodiments, the bearing support ring 520 and articulated support structure 522 are made of normal structural steel, with normal welding tolerances.

The machining of the bearing support ring 520 can be performed by use of outdoor transportable milling and drilling machines and/or at quayside. The bearing system also can be mounted (e.g. using bolts) on the bearing support ring 520 on-site at the yard.

The combination of the relatively stiff bearing support ring 520 and the articulated support structure 522 significantly reduces passing of vessel deflections to the bearings. Accordingly, designers have much more freedom in selecting the type of bearings to be used. Examples of types of possible bearings include without limitation roller bearings.

Figure 6A:
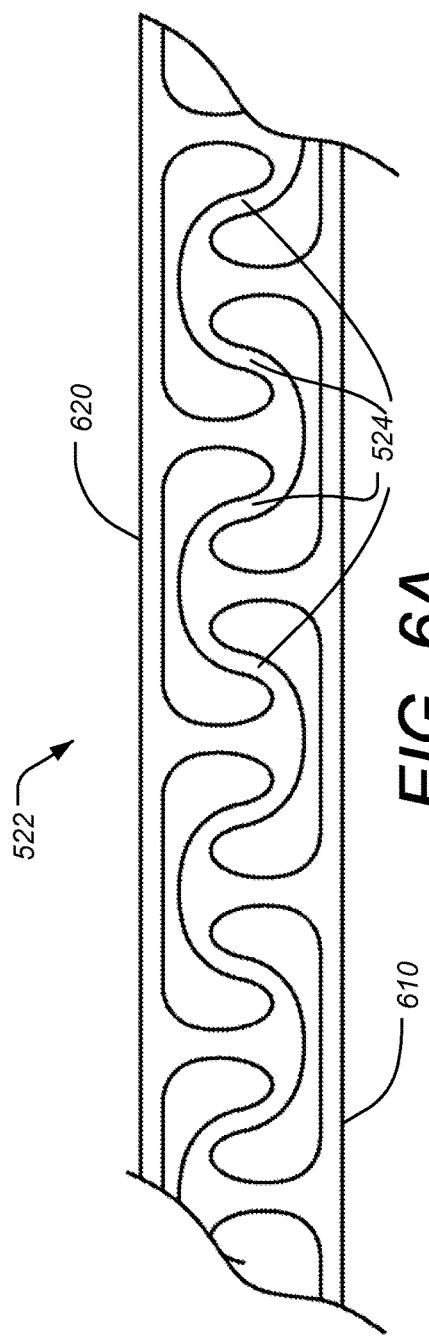
FIGS. 6A and 6B are diagrams illustrating further details of an articulated structure used for isolating a bearing system from vessel deflections, according to some embodiments of the present disclosure.
Figure 6B:
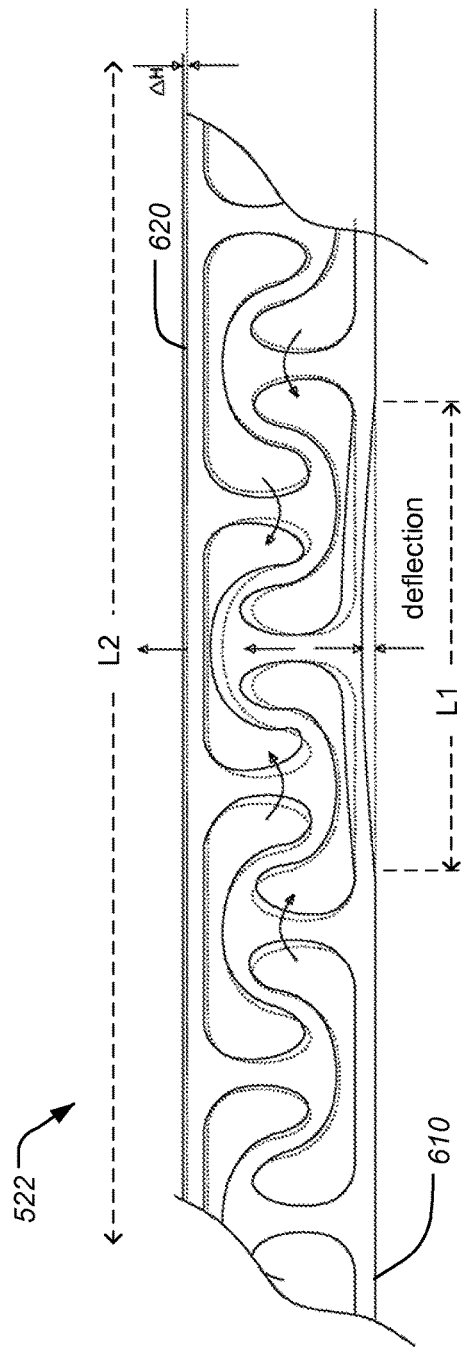

FIGS. 6A and 6B are diagrams illustrating further details of an articulated support structure for isolating a bearing system from vessel deflections, according to some embodiments. FIG. 6A shows an "unwrapped" view of articulated support structure 522. As can be seen, the structure 522 includes a plurality of articulated portions 524 which link the bottom edge 610, which is mounted to the vessel structure/caisson, to the top edge 620, which is mounted to the stiff bearing support ring. FIG. 6B shows the effect of a deflection imparted on the lower edge 610. As can be seen, a relatively large axial deflection in the lower edge 610 results in a relatively small axial deflection in the upper edge 620. Furthermore, the localized initial deflection on edge 610 is transferred into a circumferentially long length of the edge 620. In this way, even localized deflections result in a substantially uniform load to the bearings. Due to the uniform loads, the bearing capacity contingency can be greatly reduced.

While the subject disclosure is described through the above embodiments, modifications to and variations of the illustrated embodiments may be made without departing from the concepts herein disclosed. These and other variations and modifications will become apparent to those skilled in the art once the above disclosure is fully appreciated. It is intended that the following claims be interpreted to embrace all such variations and modifications.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present disclosure has been described with respect to specific details, it is not intended that such details should be regarded as limitations on the scope of the invention, except to the extent that they are included in the accompanying claims.

What is claimed is:

1. A bearing support system configured to support rotation of a turret carried by a vessel, the rotation of the turret relative to said vessel being about a substantially vertical turret axis, the bearing support system comprising:
    a vessel support structure with an opening through which the turret is positioned, the vessel support structure being deflectable in response to an external force on the vessel;
    a bearing support member configured to resist deflection in response to the external force;
    a bearing surface positioned in a fixed relationship with the bearing support member;
    a plurality of posts fixedly mounted to and rigidly extending perpendicular to the vessel support structure in parallel with the turret axis and configured to slidingly engage the bearing support member along the direction of the turret axis so as to allow relative axial movement between the vessel support structure and the bearing support member, and to prevent relative rotational movement between the vessel support structure and the bearing support member; and
    a deflection isolation system comprising a plurality of hydraulic cylinders positioned between the vessel support structure and the bearing support member, the hydraulic cylinders configured to isolate the bearing support member from a deflection in the vessel support structure while allowing the vessel support structure to support and maintain rotational alignment about the turret axis with the bearing support member.

2. The bearing support system of claim 1 wherein the plurality of posts includes four posts, two being positioned along a central longitudinal vessel center line and two being positioned transverse to the center line.

3. The bearing support system of claim 1 wherein the plurality of hydraulic cylinders comprises a plurality of groups each capable of being supplied with hydraulic fluid through a separate hydraulic system, thereby providing fault tolerance in case of a fault in a single hydraulic system.

4. The bearing support system of claim 3 wherein the plurality of groups includes at least six groups.

5. The bearing support system of claim 1 wherein the vessel is configured to receive hydrocarbons produced from a subsea subterranean reservoir.

6. The bearing support system of claim 5 wherein the vessel is a floating production, storage and offloading vessel.

7. The bearing support system of claim 1 wherein the deflection isolation system is fixedly mounted to the vessel support structure at a location away from a vertical center of the vessel.

8. The bearing support system of claim 7 wherein the deflection isolation system is fixedly mounted to the vessel support structure at or near an upper external deck of the vessel.

9. A bearing support system configured to support rotation of a turret carried by a vessel, the rotation of the turret relative to said vessel being about a substantially vertical turret axis, the bearing support system comprising:
    a vessel support structure with an opening through which the turret is positioned, the vessel support structure being deflectable in response to an external force on the vessel;
    a bearing support member configured to resist deflection in response to the external force;
    a bearing surface positioned in a fixed relationship with the bearing support member; and a deflection isolation system that includes a top edge supporting the bearing support member, a bottom edge supported by the vessel support structure, and a plurality of bendable steel portions connecting the top edge and the bottom edge, the bendable steel portions integrated circumferentially with adjacent steel portions so as to transfer a localized axial deflection of the vessel support structure along the bottom edge into a circumferential length of the bendable steel portions, thereby isolating the bearing support member from the deflection in the vessel support structure; wherein the bendable steel portions are curved so as to integrate with adjacent steel portions, such that a localized axial deflection of the vessel support structure near one steel portion is transmitted circumferentially to the adjacent steel portions.

10. The bearing support system of claim 9 wherein the plurality of bendable steel portions are a single piece of steel.

11. A method supporting rotation of a turret about a central axis of a turret mounted on a vessel, comprising:
reducing transmission of a deflection in a vessel support structure to a bearing support member using a deflection isolation system fixedly mounted to the vessel support structure at a location away from a vertical center of the vessel, the deflection isolation system comprising a plurality of hydraulic cylinders positioned between the vessel support structure and the bearing support member;
supporting the bearing support member with the deflection isolation system;
maintaining rotational alignment about the central axis between the vessel support structure and the bearing support member; and
preventing relative rotational movement between the vessel support structure and the bearing support member;
wherein the steps of maintaining rotational alignment and preventing rotational movement use a plurality of posts fixedly mounted to and rigidly extending perpendicular to the vessel support structure in parallel with the turret axis and configured to slidingly engage the bearing support member along the direction of the turret axis.

12. The method of claim 11 wherein the plurality of hydraulic cylinders comprises a plurality of groups each capable of being supplied with hydraulic fluid through a separate hydraulic system, thereby providing fault tolerance in case of a fault in a single hydraulic system.

13. The method of claim 11 wherein the plurality of posts includes four posts, two being positioned along a central longitudinal vessel center line and two being positioned transverse to the center line.

14. The method of claim 11 wherein the plurality of hydraulic cylinders comprises a plurality of groups each capable of being supplied with hydraulic fluid through a separate hydraulic system, thereby providing fault tolerance in case of a fault in a single hydraulic system.

15. The method of claim 14 wherein the plurality of groups includes at least six groups.

* * * * *